United States Patent [19]
Maley et al.

[11] Patent Number: 6,047,382
[45] Date of Patent: Apr. 4, 2000

[54] PROCESSOR WITH SHORT SET-UP AND HOLD TIMES FOR BUS SIGNALS

[75] Inventors: Reading G. Maley, San Francisco; Amos Ben-Meir, Cupertino; Anil Mehta, Milpitas, all of Calif.

[73] Assignee: Advanced Micro Devices, Inc., Sunnyvale, Calif.

[21] Appl. No.: 09/168,354

[22] Filed: Oct. 7, 1998

Related U.S. Application Data

[63] Continuation-in-part of application No. 08/938,205, Sep. 26, 1997, Pat. No. 5,915,107.

[51] Int. Cl.$^7$ .................................. G06F 1/06; G06F 1/12
[52] U.S. Cl. ............................................. 713/501; 713/400
[58] Field of Search ..................................... 713/400, 501, 713/600

[56] References Cited

U.S. PATENT DOCUMENTS

| | | | |
|---|---|---|---|
| 5,036,230 | 7/1991 | Bazes ........................................ | 307/527 |
| 5,371,416 | 12/1994 | Atriss et al. ............................... | 327/145 |
| 5,450,458 | 9/1995 | Price et al. ................................ | 375/356 |
| 5,471,587 | 11/1995 | Fernando ............................... | 713/501 X |
| 5,485,602 | 1/1996 | Ledbetter, Jr. et al. ................. | 713/600 |
| 5,535,377 | 7/1996 | Parks ........................................ | 713/400 |
| 5,634,116 | 5/1997 | Singer ...................................... | 395/551 |
| 5,914,996 | 6/1999 | Huang ....................................... | 377/39 |

*Primary Examiner*—Thomas M. Heckler
*Attorney, Agent, or Firm*—Skjerven, Morrill, MacPherson, Franklin & Friel; David T. Millers

[57] ABSTRACT

A processor includes a system bus interface that permits short set-up and hold times for bus signals including loop-back signals. Loop-back signals are transferred from an input cell in the interface to a target I/O cell in the interface without resynchronizing the loop-back signal with the processor clock. Accordingly, set-up and hold times for the loop-back signal need only be sufficient to allow for jitter or uncompensated delay in the bus clock signal at the target I/O cell. The processing core provides valid signals that might be required for generating an output signal from the target cell. The core avoids changing those signals near triggering edges of the bus clock signal to prevent the signals from changing before the target I/O cell uses the required signals. Typically, the loop-back signal determines whether I/O cell is enabled for output and is also used at the edge of the bus clock signal.

14 Claims, 4 Drawing Sheets

PROCESSOR WITH SHORT SET-UP AND HOLD TIMES FOR BUS SIGNALS

CROSS REFERENCE TO RELATED APPLICATION

This is a continuation-in-part of U.S. application Ser. No. 08/938,205, filed Sep. 26, 1997, now U.S. Pat. No. 5,915,107, which is hereby incorporated by reference in its entirety.

BACKGROUND

1. Field of the Invention

This invention relates to circuits and methods for handling signals in a circuit such as a processor having two clock domains and to input and output cells for a processor.

2. Description of Related Art

Microprocessors commonly employ a system bus that operates at a fixed clock frequency according to an established bus protocol and a processing core that operates at a higher frequency selected according to circuit performance. For such microprocessors, bus signals for control, data, and address information are synchronized with a bus clock signal. Conventionally, input bus signals become valid somewhat before a triggering edge (conventionally a rising edge) of the bus clock signal and remain valid after the edge of the bus clock signal. The time between a bus signal being valid and a triggering edge of the bus clock signal is referred to as the set-up time of the bus signal. After the triggering edge, the bus signal remains valid for a period of time referred to as the hold time. The bus protocol defines required set-up and hold times for the variety of input bus signals.

In a processor, most bus signals must be resynchronized with a processor clock for the processing core. The processing core typically includes processing paths having several stages where each stage requires a processor clock cycle for processing. To resynchronize a signal and provide a full processor clock cycle for a stage, a memory element such as a flip-flop operated off the processor clock registers a signal from a circuit element operated off the bus clock and holds the signal for a full processor clock cycle. This is sometimes referred to as the signal crossing from the clock domain of the bus to the clock domain of the processing core. Similarly, memory elements clocked by the bus clock register signals from the processing core to resynchronize the core signals for output on the bus.

The processor clock is typically generated from the bus clock but has a different frequency from that of the bus clock signal. Depending on the relationship between the frequencies of the bus and processor clocks, some edges of the processor clock signal are approximately synchronized with edges of the bus clock signal. This approximate synchronization is subject to jitter and skew introduced by frequency multipliers, phase locked loops, and other circuits that generate or distribute the processor clock signal and the bus clock signal. Such jitter and skew creates a range of possible time separations between edges of the bus clock signal and edges of the processor clock signal. This can be a problem when a bus protocol requires short set-up and hold times for bus signals because the time during which a signal is valid may not sufficiently overlap the time required for registering the signal when the signal crosses between clock domains.

Input/output (I/O) cells for a processor commonly synchronize signals crossing between a clock domain operating at the bus clock frequency and the clock domain of the processing core. For resynchronization to be successful, the signal crossing between clock domains must have set-up and hold times that are sufficient to ensure that the signal has a valid value when registered into the new clock domain.

One class of bus signals, referred to herein as loop-back signals, includes input bus signals that immediately change a property of a processor. For example, a loop-back signal might control whether a specific pin or set of pins of a processor is for input or output during the bus clock cycle that begins at the edge of the bus clock signal to which the loop-back signal sets up. Thus, the effect of the loop-back signal starts at the edge at which the loop-back signal sets up (i.e., is valid). Known processors conventionally resynchronize a loop-back signal to inform the processing core of the state of a pin and pass the loop-back signal to the I/O cell for the pin. Resynchronizing the loop-back signal with the processor clock synchronizes the loop-back signal with any signals that I/O cell may require from the processing core. A result or combined effect of the loop-back signal and the required signals from the processing core must then be resynchronized with the bus clock in the I/O cell. The resynchronizations of such loop-back signals and jitter or skew between the processor clock and the bus clock constrain the required set-up and hold times for the loop-back signals. Processors that require short set-up and hold times for bus signals such as loop-back signals are sought.

SUMMARY

In accordance with an aspect of the invention, an integrated circuit such as a processor includes a first circuit that a first clock signal clocks and a second circuit that a second clock signal clocks. The first circuit is, for example, a system bus interface and includes an input cell and an output cell. The output cell may constitute the output portion of a bidirectional I/O cell. The input cell and the output cell are connected so that the input cell receives a first signal and provides the first signal to the output cell without resynchronizing the first signal and without the first signal crossing any clock domain boundaries. The second circuit includes a memory element such as a flip-flop that is coupled to provide a second signal to the output cell. The second signal is synchronized with the second clock signal and is not allowed to change during an interval of time around when the first signal changes. This ensures that the value of the second signal cannot change before the output cell has a chance to use the second signal at a triggering edge of the first clock signal. Thus, the first signal which is synchronized with the first clock signal and used at a triggering edge of the first clock signal can have short set-up and hold time because the set-up and hold times need only allow for uncompensated skewing of the first clock signal. The set-up and hold times therefore do not depend on the relative skewing between the first and second clock signals.

In one embodiment of the invention, the integrated circuit includes edge-identifying circuitry that identifies which triggering edges of the second clock signal that are approximately synchronized with triggering edges of the first clock signal. The edge-identifying circuit, for example, can identify triggering edges of the second clock signal that are less than about one half of a clock cycle from a triggering edge of the first clock signal. The memory element in the second circuit is disabled from changing its output signal at the identified triggering edges of the second clock signal. Thus, the memory element preserves the value of the second signal until after the value is used.

In an exemplary embodiment of the invention, where the integrated circuit is a processor, the first signal is a loop-back signal that has an immediate effect on the output cell when the first signal is applied to the input cell. The loop-back signal can, for example, enable or disable the output cell to control whether the output cell outputs the second signal.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a loop-back signal passes from an input cell of a processor to one or more target I/O cells without resynchronization, and the loop-back signal takes effect in the target cell or cells without crossing time domains. In parallel, the input cell resynchronizes the loop-back signal for the processing core, and the processing core may generate signals that are required when the loop-back signal affects the target cell. To reduce the required set-up time for the loop-back signal, the processing core disables changes of selected output signals at selected edges of the processor clock. In particular, the signals that are required when the loop-back signal takes effect cannot change at triggering edges of the processor clock that are nominally synchronized with the triggering edges of the bus clock. Otherwise, when an edge of the processor clock signal leads a nearly synchronized edge of the bus clock signal, the processing core might change the required signal before the target cell registers the loop-back signal and the required signal at an edge of the bus clock signal.

Figure 1:
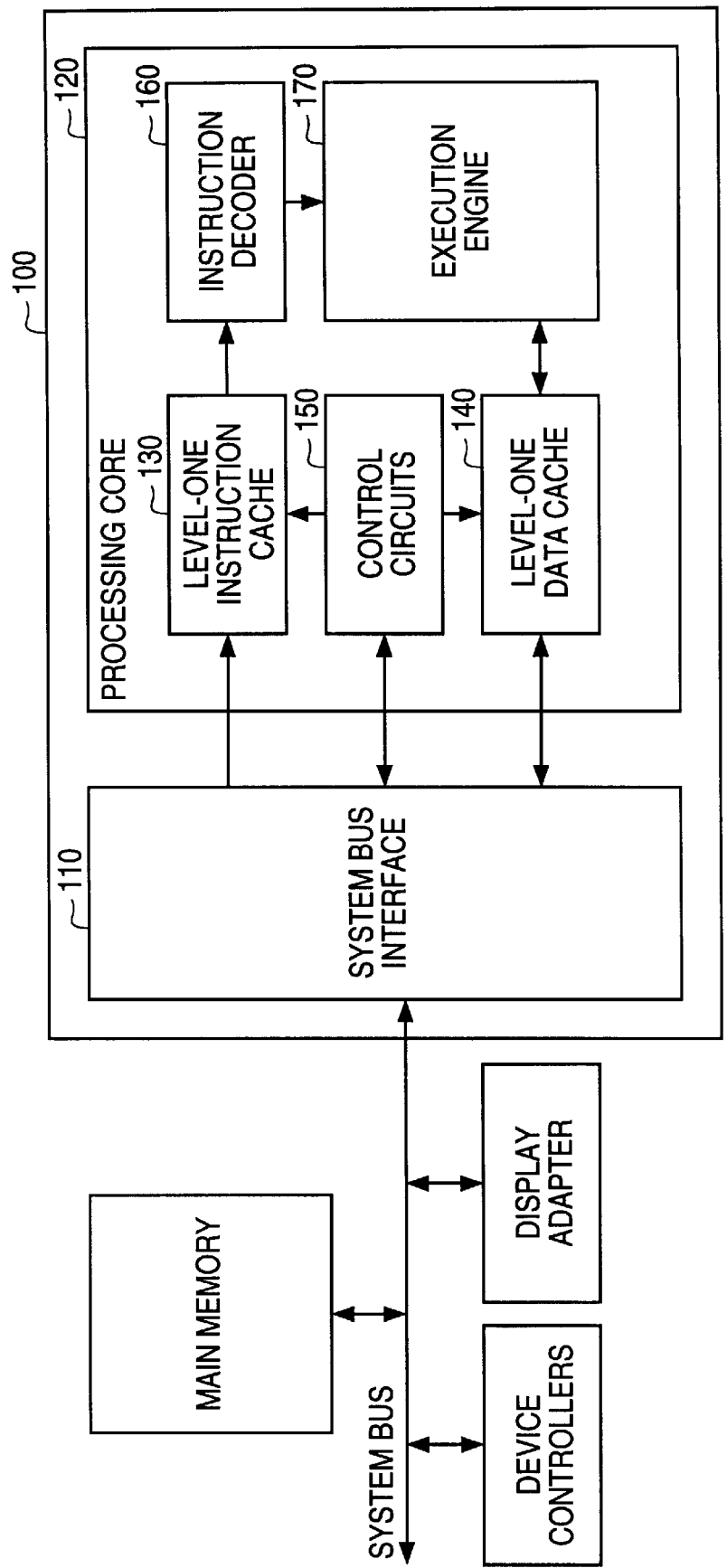
FIG. 1 is block diagram of a processor containing a system bus interface in accordance with an embodiment of the invention.

FIG. 1 shows a block diagram of a processor 100 that includes a system bus interface 110 that contains circuitry for controlling the timing of signals transferred between a clock domain for a system bus and a clock domain for a processing core 120. In the embodiment of FIG. 1, processing core 120 includes: a level-one instruction cache 130, a level-one data cache 140, and a control circuit 150 that are coupled to system bus interface 110; an instruction decoder 160 that decodes instructions from cache 130; and an execution engine 170 that executes the h-instructions. In an exemplary embodiment of the invention, processor 100 is a K6 processor available from Advanced Micro Devices, Inc., and the system bus complies with a bus configuration referred to as a Super 7 bus. A bus clock signal CLK for the Super 7 bus has a frequency of 100 MHz. An internal bus clock signal BCLK in processor 100 is nominally synchronized with and has the same frequency as the external bus clock signal CLK. Data, instructions, addresses, and control signals pass through system bus interface 110 between processing core 120 and the system bus. Processing core 120 processes incoming signals in a series of stages where each stage normally takes about one cycle of a processor clock signal PCLK. Clock signal PCLK is derived from the external clock signal CLK and has a frequency that is at least twice the frequency of clock signals CLK and BCLK.

Figure 2:
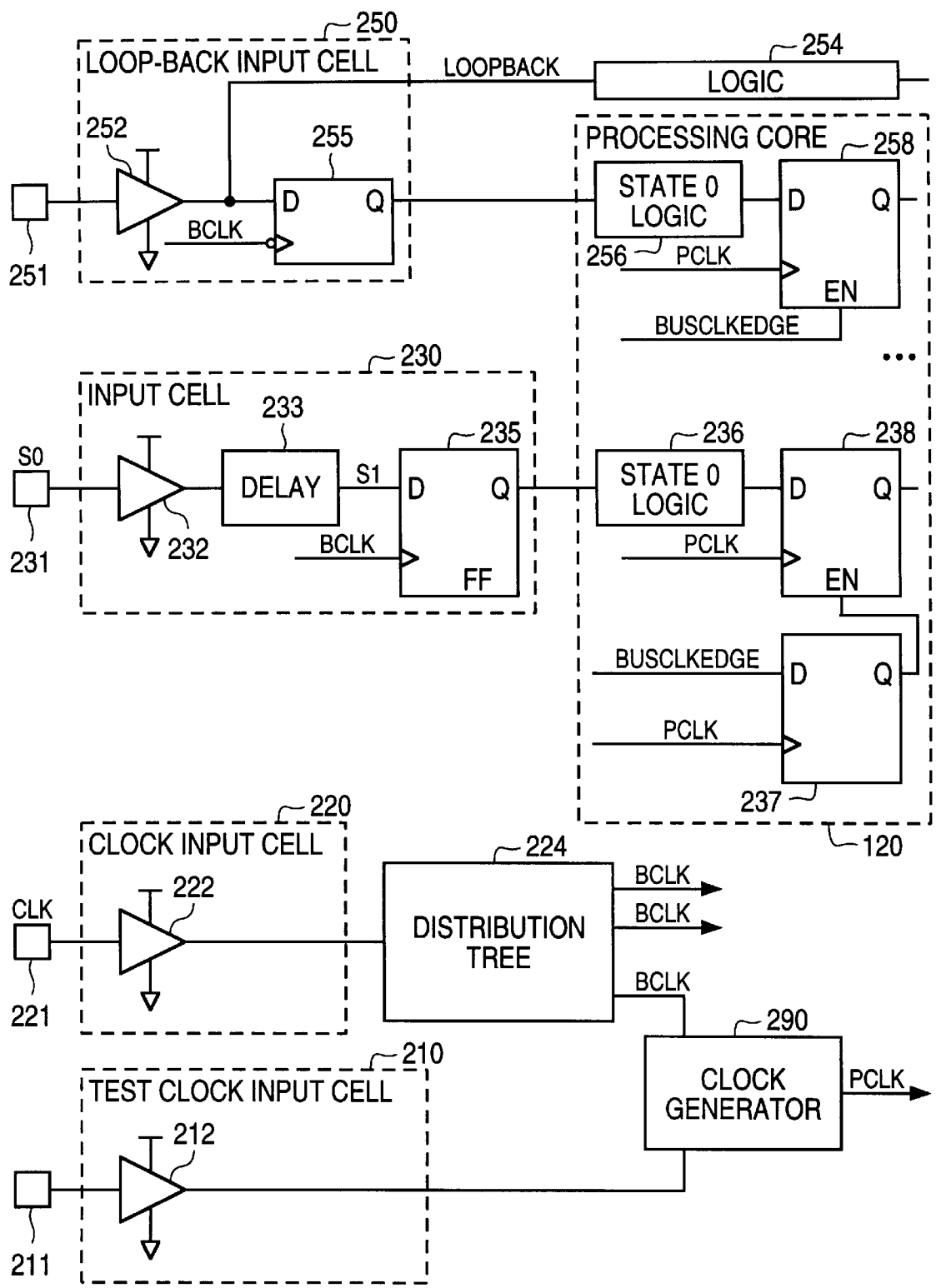
FIG. 2 is a block diagram of a portion of the processor of FIG. 1 that includes input cells.
Figure 3:
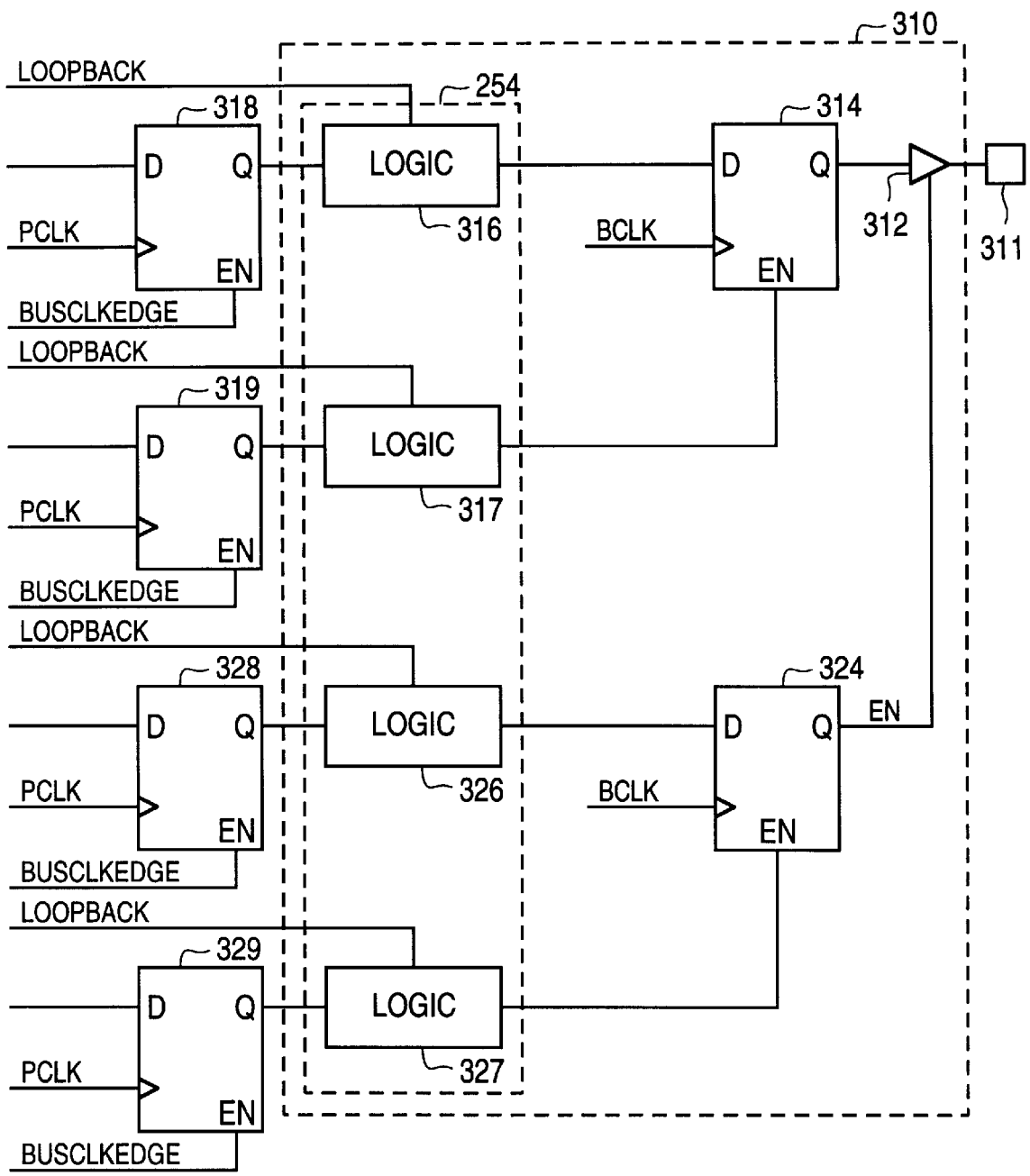
FIG. 3 is a block diagram of an output cell in the system bus interface in the processor of FIG. 1.

Processor 100 is suitable for a wide variety of computer systems. For example, one such computer system includes an integrated circuit microprocessor with a memory subsystem (e.g., RAM), a display adapter, disk controller/adapter, various input/output interfaces and adapters, and corresponding external devices. Memory, adapters, and interfaces are conventionally coupled to processor 100 via the system bus and system bus interface 110, and system bus interface 110 has several types of input and output cells for those connections. FIG. 2 shows input cells including an input cell 210 for a test clock signal, an input cell 220 for the bus clock signal, an input cell 230 for a data, address, or control signal, and an input cell 250 for a loop-back signal. FIG. 3 shows an output cell for a signal under the control of a loop-back signal.

External clock signal CLK controls the timing of input signals to processor 100. Input cell 220 receives clock signal CLK at a pad 221, and an input receiver 222 adjusts the voltage level of signal CLK as required for processor 100. A clock distribution tree 224 includes drivers that distribute signal CLK throughout processor 100 as internal bus clock signal BCLK. A clock generator 290 receives signal BCLK and generates processor clock signal PCLK for processing core 120.

Figure 4:
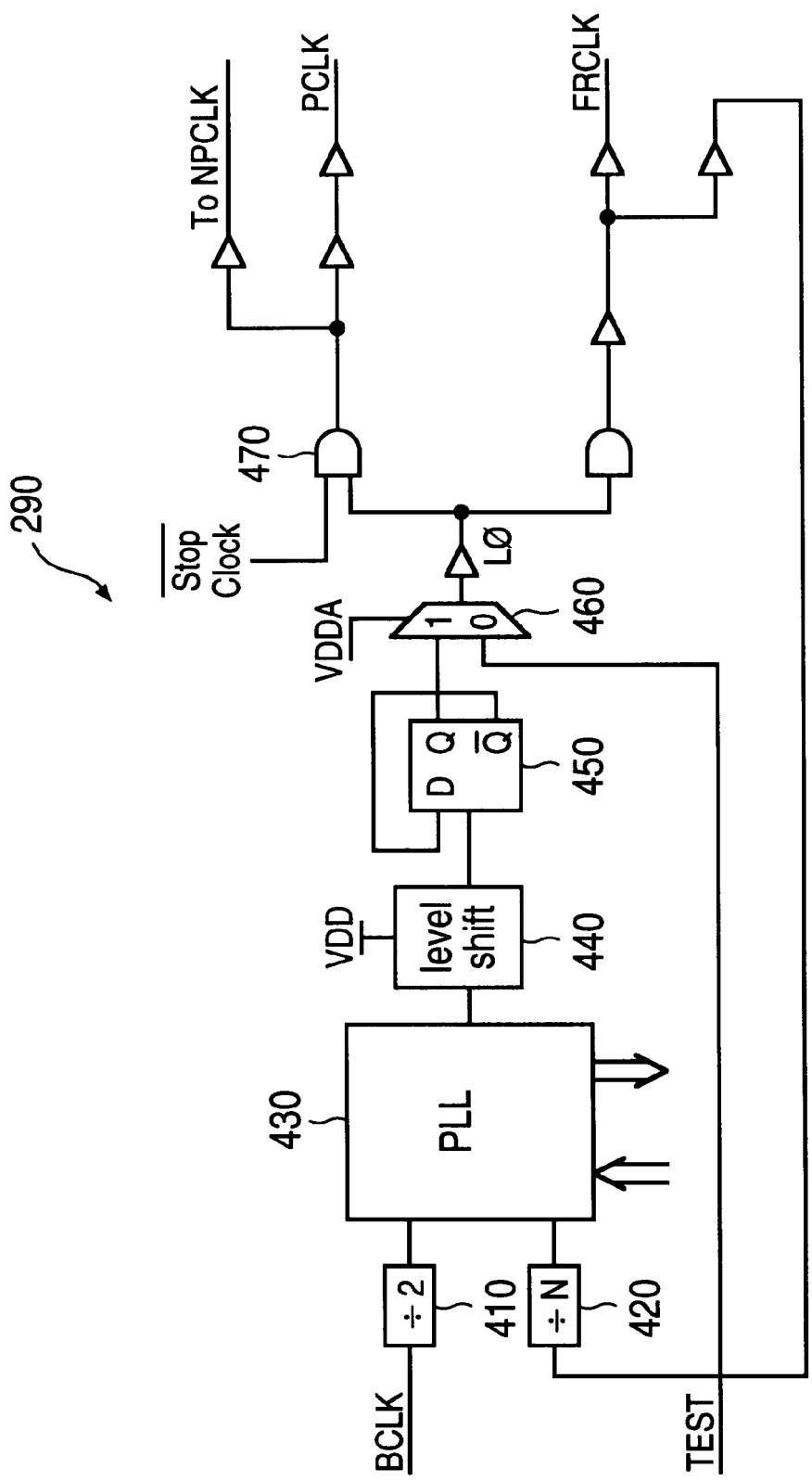
FIG. 4 is a block diagram of a clock signal generator and distribution circuits for the processor of FIG. 1.

As shown in FIG. 4, clock circuit 290 includes frequency dividers 410 and 420, a phase locked loop (PLL) 430, a flip-flop 450, a multiplexer 460 and a buffer 470. Frequency divider 410 provides to PLL 290 a signal having half of the frequency $f_B$ of signal BCLK, and frequency divider 420 provides to PLL 430 a signal having a frequency equal to the frequency $f_P$ of signal PCLK divided by an integer N. In operation, PLL 430 compares to the signals from dividers 410 and 420 and maintains signal PCLK at a frequency $f_P$ that keeps the signals from dividers 410 and 420 in phase and at the same frequency. Accordingly, the frequency $f_P$ of the processor clock signal PCLK is a half-integer (N/2) multiple of the frequency $f_B$ of bus clock signal BCLK. In the exemplary embodiment, integer N has a range from 4 to 11 and is selected according to testing that determines the maximum operable frequency for processor 100. Accordingly, frequency $f_P$ ranges between 2 and 5.5 times frequency $f_B$ Flip-flop 450 sharpens the transitions in the signal from PLL 430 and functions as a divide by two counter to set the duty cycle of processor clock signal PCLK to 50%, regardless of the duty cycle of the PLL output. Clock circuit 290 also includes a multiplexer 460 for replacing the clock signal from PLL 430 with a signal TEST input through input cell 210 during debugging or testing. Otherwise the output signal from PLL 430 is routed through flip-flop 450, multiplexer 460, and buffers 470 for use as processor clock signal PCLK.

Input cell 230, which is for input of a data, address, or control signal S0, includes an input receiver 232, a delay circuit 233, and a flip-flop 235. A pad 231 receives an input address, control, or data signal for processor 100. Input receiver 232 adjusts the voltage level of the input signal for use in processor 100, and delay circuit 233 provides a programmable delay that optimizes setup and hold times for the input signal. For each input cell of processor 100, the programmed delay time of delay 233 depends on the delay in the distribution of signal BCLK to that input cell and the delay in input receiver 232. In particular, circuit elements 232 and 233 delay reception of a signal S1 at flip-flop 234 so that signal S1 has the same synchronization with BCLK that the input signal S0 at pad 231 has with clock signal CLK at pad 221. An edge of signal BCLK at flip-flop 235 is thus closely synchronized with signal S1 becoming valid. Accordingly, set-up and hold times of input signals need only be sufficient to accommodate jitter and any remaining skew between signals CLK and BCLK. Thus, set-up and hold times for control signals can be short.

Flip-flop 235 provides a valid input signal to processor core 120 beginning at an edge of internal bus clock signal BCLK and continuing for a full clock cycle of clock signal BCLK. The minimum duration of a cycle of clock signal BCLK is about 2 clock cycles of processor clock signal PCLK. An initial stage of logic 236 in processor core 120 processes the input signal during the time between a rising edge of signal BCLK that triggers flip-flop 235 and a rising edge of signal PCLK that triggers a flip-flop 238 in processing core 120. A flip-flop 237 enables or disables clocking of flip-flop 238 to prevent triggering of flip-flop 238 at a rising edge of signal PCLK that is a half cycle of signal PCLK or less from a rising edge of signal BCLK. Accordingly, because of the limitations on the frequency $f_P$ of signal PCLK, flip-flop 238 does not register a new value from logic 236 until about one processor clock cycle or more after flip-flop 235 registers a new value. In the worst case, the rising edge of signal PCLK follows the rising edge of signal BCLK by one processor clock cycle, and the skew between signals BCLK and PCLK advances signal PCLK by a maximum skew. The worst case provides less than one processor clock cycle for initial stage 236 to process the signal from flip-flop 235. Accordingly, logic 236 must be able to complete a first stage of processing the input signal in less than a full processor clock cycle in order to absorb the worst case skew. If necessary, circuitry in logic stage 236 can be optimized for faster execution or some of the initial processing can be move from stage 236 to other processing stages to meet the timing constraint. Such techniques for adjusting the processing times for stages in a processing core are known in the art and depend on the specific processing performed.

Input cell 230 effectively moves the penalty due to possible phase misalignment of clock signals BCLK and PCLK from bus signals at pads 231 to initial logic 236 in processing core 120. The set-up and hold times of bus signals to cells 230 must allow for possible phase misalignment between signals CLK and BCLK, for which delay circuits 233 fail to account, but bus signals do not need larger set-up or hold times to compensate for skew between clock signals BCLK and PCLK. Accordingly, input cells 230 and 240 can handle signals that have short set-up and hold times. For data signals in the exemplary embodiment of the invention, the set-up and hold times are 1.7 ns and 1.5 ns respectively. The set-up and hold time are respectively 3 ns and 1.0 ns for address signals in the exemplary embodiment of the invention.

The exemplary bus protocol includes bus signals referred to as loop-back signals. Loop-back signals convey instructions that processor 100 must implement at the next rising edge of the bus clock signal. For example, a loop-back signal may instruct processor 100 to immediately back off of or avoid driving an output signal to a particular set of pins during a commencing bus clock cycle. Input cell 250 is for a loop-back signal received at a pad 251 and includes only an input receiver 252 between pad 251 and logic 254. Thus, logic 254 receives and processes the loop-back signal LOOPBACK without any intervening latches or flip-flops. For example, logic 254 may simply route the loop-back signal to an output portion of a bidirectional I/0 cell. Loop-back logic 254 provides a result signal to the circuits affected, for example, in an output cell 310 (FIG. 3), within a single bus clock cycle. As described below, the resulting signal can affect a target I/O cell by enabling or disabling output from a pin. Loop-back input cell 250 also directs the loop-back signal from pad 251 to processing core 120 via a low latch 255, a flip-flop (not shown), or any suitable memory element that registers the loop-back signal for a first stage of logic 256 in processing core 120. A flip-flop 258, which processor clock signal PCLK clocks, synchronizes the output signal from logic 256 for additional stages of processing (if necessary) in processing core 120. Processing core 120 can also process the loop-back signal if necessary to affect outputs on later processor operations.

FIG. 3, for example, shows an output cell 310 which includes a tristate buffer 312 connected to an I/O pin 311. I/O pin 311 can be a bidirectional pin that output cell 310 shares with an input cell such as input cell 230 of FIG. 2. In output cell 310, a flip-flop 314, which signal BCLK clocks, registers an output signal and applies the output signal to buffer 312, and a flip-flop 324, which signal BCLK also clocks, registers an enable signal that enables or disables buffer 312. Two portions of logic 316 and 317 connect to flip-flop 314. Logic 316 generates a signal for output through output cell 310. In the general case, the output signal from logic 316 may depend on signal LOOPBACK. However, the output signal from logic 316 typically depends on output from processing core 120 via a PCLK-triggered flip-flop 318 and is independent of signal LOOPBACK. Logic 317 generates an enable signal for flip-flop 314 that enables or disables flip-flop 314. If enabled at a rising edge of signal BCLK, flip-flop 314 registers the signal from logic 316 and change the signal applied to buffer 312. Flip-flop 314 is disabled to preserve the value stored in flip-flop 314, for example, for later output via pin 311 if buffer 312 is currently disabled.

Two portions of logic 326 and 327 similarly connect to flip-flop 324. Logic 326 connects to the data input of flip-flop 324 and generates an enable signal for buffer 312. Typically, the enable signal from logic 326 depends on the current loop-back signal LOOPBACK. For example, logic 326 may simply apply signal LOOPBACK to the data input of latch 324 so that logic 326 does not require any signals from a PCLK-triggered flip-flop 328 in processing core 120. However, in the general case, the signal from logic 326 may depend on an output signal processing core 120 provides via triggered flip-flop 328. Logic 327 generates an enable signal for flip-flop 324 that determines whether flip-flop 324 will register the signal from logic 326 and change the enable signal to buffer 312.

In an exemplary application of output cell 310, processing core 120 enables flip-flops 314 and 324 through respective logic 317 and 327 and provides an output signal through logic 316 to flip-flop 314, and input cell 250 applies loop-back signal LOOPBACK to the data terminal of flip-flop 324 via logic 326. The loop-back signal remains in the bus clock domain and does not require synchronization with the processor clock signal PCLK. Accordingly, the set-up and hold times of the loop-back signal need only be sufficient for a BCLK-triggered flip-flop to register a valid value, and do not need to accommodate any skew between signal BCLK and signal PCLK. However, since the output signal from output cell 310 depends on a signal from flip-flop 318 in processing core 120, processing core 120 must provide a valid signal from flip-flop 318 enough time before a triggering edge of BCLK that logic 316 can provide a valid signal to flip-flop 314. For example, processing core 120 can provide a valid output signal about one cycle of signal PCLK or more the triggering edge of clock signal BCLK. Processing core 120 is not permitted to change the output from flip-flop 318 at edges of signal PCLK that are nearly synchronized with rising edges of signal BCLK. Otherwise, if a triggering edge of signal PCLK leads a nearly aligned triggering edge of signal BCLK, processing core 120 could change the valid signal to flipflop 314 before flip-flop 314 registers the signal for output.

U.S. patent application Ser. No. 08/938,219, entitled "Even Bus Clock Circuit" now U.S. Pat. No. 5,898,640 issued on Apr. 27, 1999 and U.S. patent application Ser. No. 08/938,205, entitled "Cross Clock Domain Clocking For A System Using Two Clock Frequencies Where One Frequency is a Fractional Multiple of the Other" now U.S. Pat. No. 5,915,107 issued Jun. 22, 1999, describe circuitry that identifies when rising edges of a bus clock signal and a processor clock signal are nearly simultaneous and circuitry that disables registering of new values when such edges are nearly simultaneous. Those applications are hereby incorporated by reference in their entirety.

Although the invention has been described with reference to particular embodiments, the description is only an example of the invention's application and should not be taken as a limitation. For example, although disclosed embodiments of the invention are processors or computer systems, the synchronization techniques described can also be used in other integrated circuit having multiple clock domains. Further, although FIGS. 2 and 3 respectively illustrate input and output cells, such cells can be combined or attached to the same I/O pin to provide bidirectional I/O cells. Further, although the exemplary embodiment of the invention employs specific memory elements such as flip-flops or latches, other types of memory elements which register signal values can be employed. Various other adaptations and combinations of features of the embodiments disclosed are within the scope of the invention as defined by the following claims.

We claim:

1. An integrated circuit comprising:
   a first circuit that is clocked by a first clock signal having a first frequency, the first circuit including an input cell and an output cell, the input cell and the output cell being connected so that the input cell receives a first signal and provides the first signal to the output cell; and
   a second circuit that is clocked by a second clock signal, the second clock signal having a second frequency that differs from the first frequency, the second circuit including a memory element coupled to provide a second signal from the second circuit to the output cell, wherein:
      the memory element changes the second signal when clocked by the second clock signal; and
      the second circuit prevents the memory element from changing the second signal at edges of the second clock signal that correspond to edges of the first clock signal at which the first signal changes.

2. The integrated circuit of claim 1, wherein:
   the integrated circuit comprises a processor;
   the first circuit comprises a system interface of the processor; and
   the second circuit comprises a processing core of the processor.

3. The integrated circuit of claim 2, wherein the first signal is a loop-back signal that has an immediate effect on the output cell when the first signal is applied to the input cell.

4. The integrated circuit of claim 1, wherein the second circuit prevents the memory element from changing the second signal at edges of the second clock signal that are less than about one half of a clock cycle of the second clock signal from an edge of the first clock signal at which the first circuit changes the first signal.

5. The integrated circuit of claim 1, wherein the second signal is an output signal for output through the output cell, and the first signal is an enable signal that enables or disables the output cell.

6. The integrated circuit of claim 1, wherein the memory element is a flip-flop having a clock terminal coupled to receive the second clock signal.

7. The integrated circuit of claim 6, wherein the flip-flop has an enable terminal coupled to receive a signal that disables changing of the second signal at edges of the second clock signal that corresponds to edges of the first clock signal at which the first signal changes.

8. The integrated circuit of claim 1, wherein the output cell is part of a bi-directional input/output cell.

9. The integrated circuit of claim 1, wherein the second frequency is at least twice the first frequency.

10. A processor comprising:
    a bus interface that is clocked by a first clock signal having a first frequency, the bus interface including an input cell and an output cell, the input cell and the output cell being connected so that the input cell receives a first signal from a system bus and provides the first signal to the output cell;
    a processing core that is clocked by a second clock signal, the second clock signal having a second frequency that differs from the first frequency, the processing core including a memory element coupled to provide a second signal to the output cell, wherein:
       the memory element changes the second signal when clocked by the second clock signal; and
       the processing core prevents the memory element from changing the second signal at edges of the second clock signal that correspond to edges of the first clock signal at which the first signal changes.

11. A computer system comprising a processor comprising:
    a bus interface that is clocked by a first clock signal having a first frequency, the bus interface including an input cell and an output cell, the input cell and the output cell being connected so that the input cell receives a first signal from a system bus and provides the first signal to the output cell;
    a processing core that is clocked by a second clock signal, the second clock signal having a second frequency that differs from the first frequency, the processing core including a memory element coupled to provide a second signal to the output cell, wherein:
       the memory element changes the second signal when clocked by the second clock signal; and
       the processing core prevents the memory element from changing the second signal at edges of the second clock signal that correspond to edges of the first clock signal at which the first signal changes.

12. The computer system of claim 11, further comprising a system bus and a memory coupled to the bus interface circuitry via the system bus.

13. A method for controlling an input/output cell, comprising:
    receiving at an input cell a first signal that is synchronized with a first clock signal;
    generating a second signal that is synchronized with a second clock signal, the second clock signal having a frequency that differs from that of the first clock signal, wherein generating the second signal comprises changing the second signal only at edges of the second clock signal that are more than about one half clock cycle of the second clock signal from edges of the first clock signal at which the first clock signal changes;

applying the first signal to the input/output cell without resynchronizing the first clock signal;

applying the second clock signal to the input/output cell; and using the second signal to generate an output signal for the input/output cell, the output signal being synchronized with the first clock signal.

14. The method of claim 13, further comprising determining from the first whether the input/output cell is able to output the output signal.

* * * * *